United States Patent [19]

Yang

[11] Patent Number: 5,355,550

[45] Date of Patent: Oct. 18, 1994

[54] PIVOTING CASTOR

[76] Inventor: Su-Hua Yang, 25, Lane 97, Hertzuoh St., Fong-Yuan, Taichung, Taiwan

[21] Appl. No.: 137,918

[22] Filed: Oct. 19, 1993

[51] Int. Cl.$^5$ ............................................. B60B 33/00
[52] U.S. Cl. ............................................. 16/44; 16/35 R
[58] Field of Search ............... 16/44, 32, 33, 35 R, 16/38, 39, 47

[56] References Cited

U.S. PATENT DOCUMENTS

| | | | |
|---|---|---|---|
| 3,914,821 | 10/1975 | Screen | 16/35 R |
| 4,455,707 | 6/1984 | Screen | 16/35 R |
| 4,731,899 | 3/1988 | Huang | 16/44 |
| 4,821,369 | 4/1989 | Daniels | 16/44 |
| 5,165,141 | 11/1992 | Soltani | 16/44 |
| 5,259,088 | 11/1993 | Yang | 16/44 |
| 5,276,941 | 1/1994 | Chen | 16/44 |

*Primary Examiner*—Kurt C. Rowan
*Assistant Examiner*—Chuck Y. Mah
*Attorney, Agent, or Firm*—Browdy and Neimark

[57] ABSTRACT

A pivoting castor comprises a main body, a cross shaft, two wheeled members, a braking member, an elastic element, and a plug cover. The main body is provided with a receiving space, and a pivoting hole having respectively under both sides thereof a recessed arcuate collar block with a first contact portion. The two wheeled members are mounted on both ends of the cross shaft pivoted in the pivoting hole of the main body. The wheeled member is provided with a second contact portion engageable with the first contact portion to incapacitate the mobility of the wheeled members. The engagement of the first and the second contact portions is actuated by the elastic element received in the receiving space of the main body.

10 Claims, 5 Drawing Sheets

PIVOTING CASTOR

BACKGROUND OF THE INVENTION

The present invention relates generally to a pivoting castor, and more particularly to a pivoting castor having a braking device.

As shown in FIG. 1, an office chair 10, such as a computer chair, is generally provided with at least five castors 11, each of which is attached to each leg of a swiveled frame of the chair 10 so that the chair 10 can be moved around easily by a person sitting thereon. However, all five castors 11 of the chair 10 remain movable when the chair 10 is not occupied. As a result, an unoccupied chair 10 can be caused easily and accidentally to move away from a place where it is intended to be, especially on a slightly inclined floor. It happens from time to time that a person sitting on the chair 10 has to leave the chair 10 for a moment and then to return to the chair 10 without being aware of the fact that the chair 10 has been caused to move away from the place where it is intended to be. Therefore, the person is vulnerable to a bodily injury if he or she misses the chair 10. Such an office accident caused by the chair 10 can turn out to be a serious mishap if that person in question happens to be a pregnant woman.

SUMMARY OF THE INVENTION

It is therefore the primary objective of the present invention to provide an office chair with pivoting castors having a braking device capable of causing the unoccupied office chair to remain stationary so as to ensure the safety of the office worker.

The foregoing objective of the present invention can be more readily understood upon a thoughtful deliberation of the following detailed description of the present invention in conjunction with the drawings provided herewith.

DETAILED DESCRIPTION OF THE INVENTION

Figure 1:
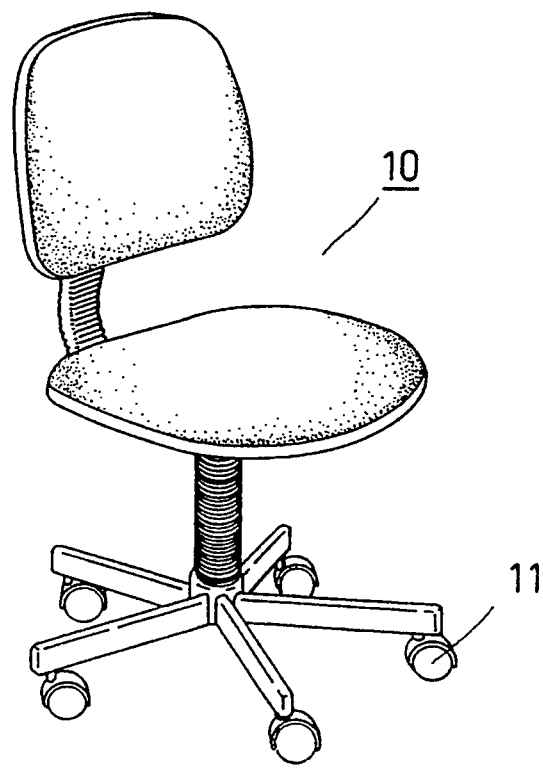
FIG. 1 shows a perspective view of an office chair of the prior art.
Figure 3:
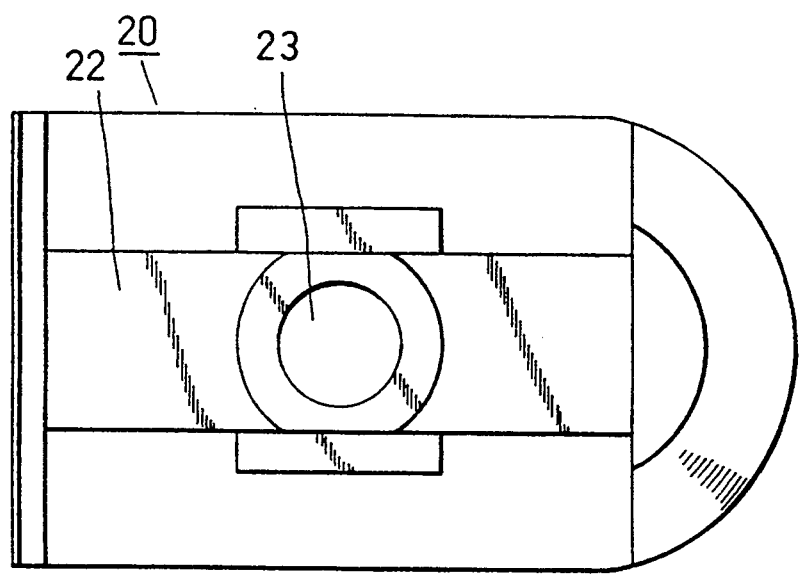
FIG. 3 shows a bottom plan view of a main body as shown in FIG. 2.
Figure 2:
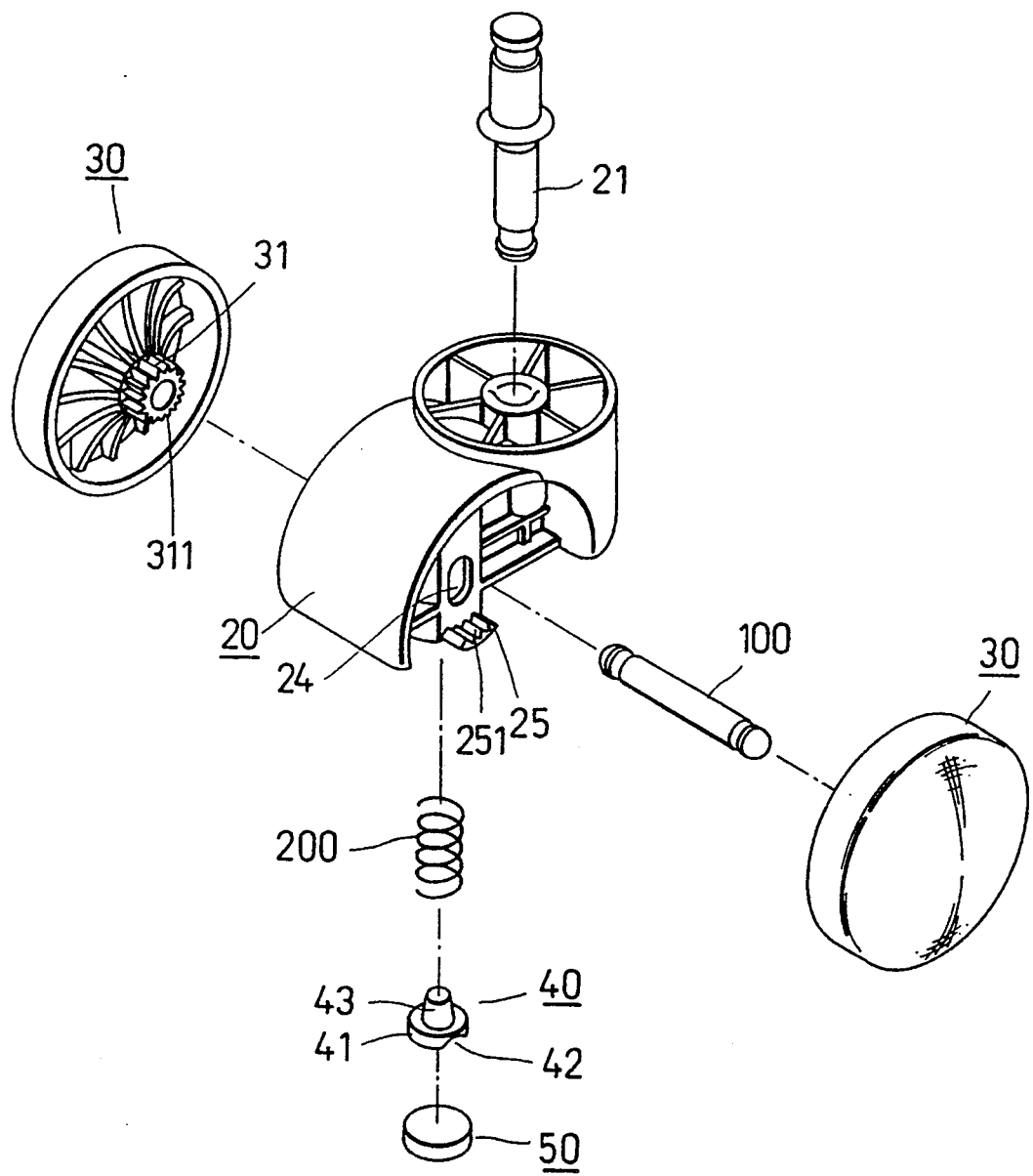
FIG. 2 shows an exploded view of a first preferred embodiment of the present invention.
Figure 4:
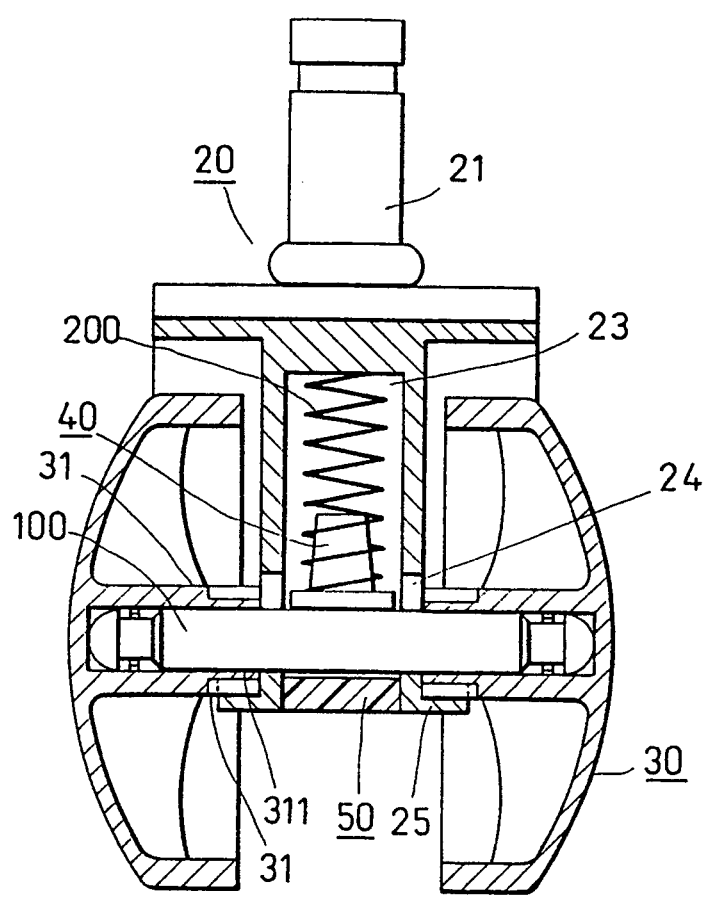
FIG. 4 shows a sectional view taken along the direction of the longitudinal axis of a cross shaft 100 of the first preferred embodiment in combination, according to the present invention as shown in FIG. 2.
Figure 5:
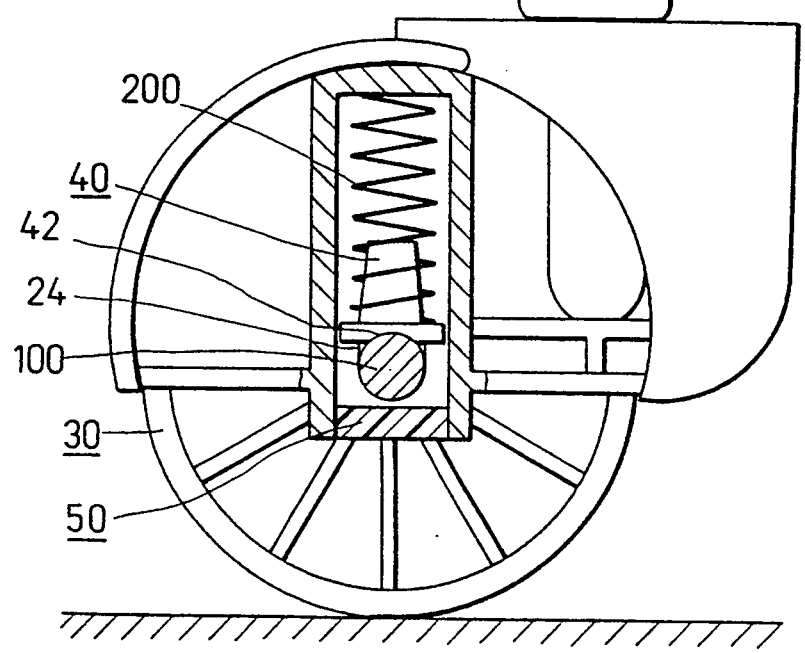
FIG. 5 shows a sectional view taken along the radial direction of the cross shaft 100 of the first preferred embodiment in combination, according to the present invention as shown in FIG. 2.

Referring to FIGS. 2-5, the first preferred embodiment of the present invention is shown to comprise a main body 20, a cross shaft 100, two wheeled members 30, a braking member 40, an elastic element 200, and a plug cover 50.

The main body 20 is made of a plastic material by injection molding and is provided in one side thereof with a shaft post 21 pivoted thereto. The shaft post 21 is intended for use in pivoting the main body 20 under the outer end of each branch of the claw-shaped bottom seat of a chair. The bottom portion 22 is provided centrally and upwardly with a receiving space 23 of cylindrical construction and having an opening facing downwards. The bottom portion 22 is further provided is an upper portion of the center thereof with a pivoting hole 24 having a cross section of an upright oblong construction. The pivoting hole 24 is provided respectively under both outer sides thereof with a recessed arcuate collar block 25, which is provided in the circumferential surface of the top thereof with a plurality of slots 251.

The cross shaft 100 has a midsection pivoted in the pivoting hole 24 of the main body 20.

The two wheeled members 30 are mounted respectively on both ends of the cross shaft 100 and provided respectively on the inner side surface thereof with a shaft tube portion 31 which has an outer segment provided in the circumferential surface thereof with a plurality of ridges 311 corresponding in location to the slots 251 of the recessed arcuate collar block 25.

The braking member 40 is mounted over the midsection of the cross shaft 100 and is provided with a disk portion 41 having an arcuate slot 42 disposed in the bottom thereof. The disk portion 41 further has a post 43 extending upwards from the top thereof. The arcuate slot 42 is attached to the top of the midsection of the cross shaft 100.

The elastic element 200 is a compression spring, which is received in the receiving space 23 of the main body 20 such that the top end of the elastic element 200 urges the top wall of the receiving space 23, and that the bottom end of the elastic element 200 urges the top of the disk portion 41 of the braking member 40. The elastic element 200 is located securely by means of the post 43. The cross shaft 100 is pressed directly by the elastic element 200 so as to cause the midsection of the cross shaft 100 to be situated at the lower segment of the pivoting hole 24. In the meantime, some of the ridges 311 of the two wheeled members 30 are caused to insert into the slots 251 of the recessed arcuate collar block 25 of the main body 20.

The plug cover 50 is fitted with an appropriate tightness into the opening located under the receiving space 23 of the main body 20.

Figure 6:
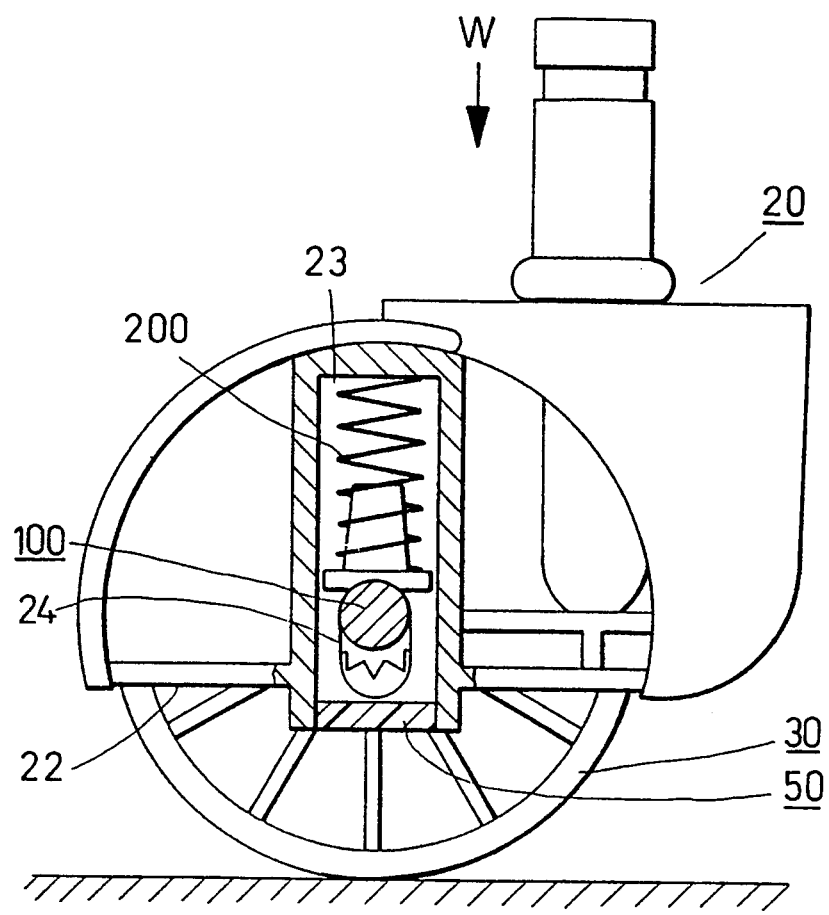
FIG. 6 is similar to FIG. 5 and shows the present invention in action when occupied by a person.

As shown in FIG. 6, the weight W of a person sitting on the chair is such that the weight W overcomes the stretching force of the elastic element 200, thereby resulting in the downward movement of the entire main body 20. As the elastic element 20 is compressed, the cross shaft 100 and the two wheeled members 30 remain stationary. Therefore, the slots 251 of the recessed arcuate collar block 25 are no longer restrained by the ridges 311 of the wheeled members 30. As a result, the wheeled members 30 are able to slide and roll. As soon as the hip of a person sitting on the chair is moved away from the seat of the chair, the main body 20 is caused to move back up to its original position by the stretching force of the elastic element 200, thereby causing the slots 251 to engage once again the ridges 311. The engagement of the slots 251 and the ridges 311 disable the mobility of the castor.

Figure 7:
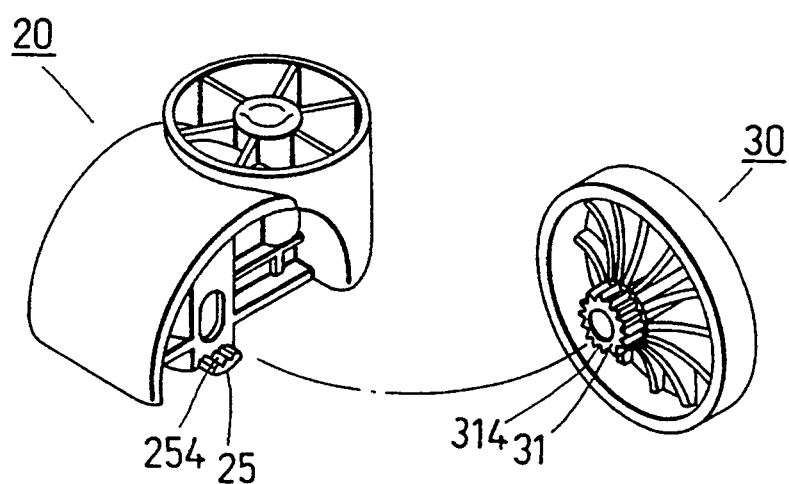
FIG. 7 shows a schematic view of the structure of a second preferred embodiment of the present invention.

The second preferred embodiment of the present invention is shown in FIG. 7, in which the recessed arcuate collar block 25 of the main body 20 is provided in the circumferential surface of the top thereof with a plurality of ridges 254 corresponding in location to a plurality of slots 314 disposed in the circumferential surface of the outer segment of the shaft tube portion 31 of the wheeled members 30.

Figure 8:
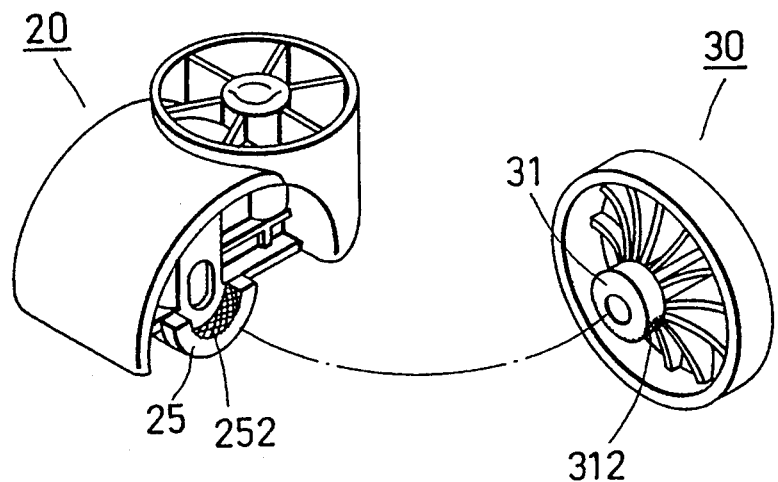
FIG. 8 shows a schematic view of the structure of a third preferred embodiment of the present invention.

The third preferred embodiment of the present invention, as shown in FIG. 8, is different from the first preferred embodiment of the present invention in that the main body 20 of the third preferred embodiment has a recessed arcuate collar block 25 provided in the circumferential surface of the top thereof with an embossed portion 252, and that the wheeled member 30 of the third preferred embodiment of the present invention has a shaft tube portion 31 provided in the bottom of the circumferential surface of the outer segment thereof with an embossed portion 312 opposite to the embossed portion 252 of the main body 20. The mechanical friction between these two embossed portions 252 and 312 incapacitates the mobility of the castor.

Figure 9:
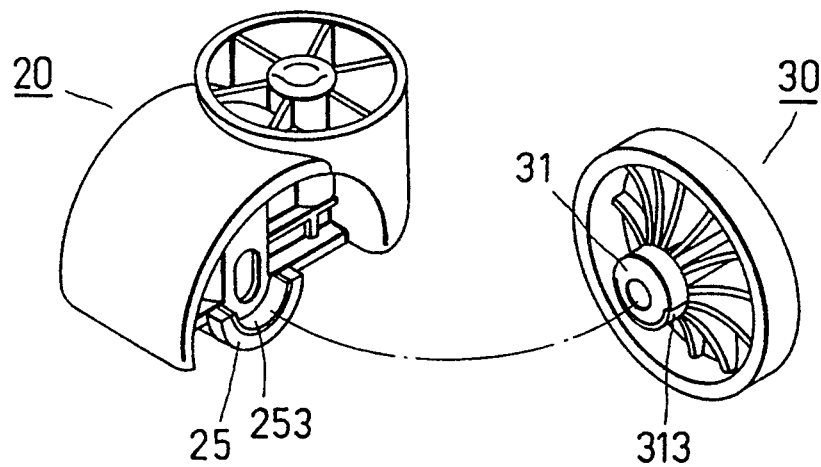
FIG. 9 shows a schematic view of the structure of a fourth preferred embodiment of the present invention.

As shown in FIG. 9, the main body 20 of the fourth preferred embodiment of the present invention has a recessed arcuate collar block 25 provided in the circumferential surface of the top thereof with a brake shoe 253. Similarly, the shaft tube portion 31 of the wheeled member 30 is provided in the bottom of the circumferential surface of the outer segment thereof with a brake shoe 313.

While the invention has been described in connection with what is presently considered to be the most practical and preferred embodiments, it is to be understood that the invention is not to be limited to the disclosed embodiment but on the contrary, is intended to cover various modifications and equivalent arrangements included within the spirit and scope of the appended claims which scope is to be accorded the broadest interpretation so as to encompass all such modifications and equivalent structures.

What is claimed is:

1. A pivoting castor comprising:

a main body provided on one side thereof with a shaft post pivoted thereto and intended to permit said main body to be mounted pivotally under an outer end of each branch of a claw-shaped bottom seat of a chair, said main body having a bottom provided centrally and upwardly with a receiving space of cylindrical construction and having an opening facing downwards, said bottom of said main body further provided in an upper portion of a center thereof with a pivoting hole having a cross section of an upright oblong shape, said pivoting hole provided respectively under both sides thereof with a recessed arcuate collar block provided in a circumferential surface of a top thereof with a first contact portion;

a cross shaft having a midsection pivoted in said pivoting hole of said main body;

two wheeled members pivoted respectively to both ends of said cross shaft and provided respectively in an inner side thereof with a shaft tube portion provided in a circumferential surface thereof with a second contact portion;

a braking member mounted over said midsection of said cross shaft and provided with a disk portion having a bottom provided with an arcuate slot and having a top provided with a post extending upwards therefrom, said arcuate slot being attached to a top surface of said midsection of said cross shaft; and an elastic element disposed in said receiving space of said main body such that a top end of said elastic element urges a top wall of said receiving space, and that a bottom end of said elastic element urges said disk portion of said braking member, and further that said post is fitted into a lower segment of said elastic element, and still further that said elastic element presses downwards said cross shaft so as to cause said midsection of said cross shaft to move downwards to reach a lower segment of said pivoting hole, thereby causing said second contact portion of said two wheeled members to engage said first contact portion of said main body so as to incapacitate the mobility of said wheeled members.

2. A pivoting castor of claim 1 wherein said first contact portion is provided with a plurality of slots; and wherein said second contact portion is provided with a plurality of ridges arranged at an interval in a circumferential surface of said shaft tube portion.

3. A pivoting castor of claim 2 further comprising a plug cover fitted within said opening of said receiving space.

4. A pivoting castor of claim 1 wherein said first contact portion is provided with a plurality of ridges; and wherein said second contact portion is provided with a plurality of slots arranged at an interval in a circumferential surface of said shaft tube portion.

5. A pivoting castor of claim 4 further comprising a plug cover fitted within said opening of said receiving space.

6. A pivoting castor of claim 1 wherein said second contact portion is embossed.

7. A pivoting castor of claim 6 further comprising a plug cover fitted within said opening of said receiving space.

8. A pivoting castor of claim 1 wherein said first contact portion and said second contact portion are brake shoes.

9. A pivoting castor of claim 8 further comprising a plug cover fitted within said opening of said receiving space.

10. A pivoting castor of claim 1 further comprising a plug cover fitted within said opening of said receiving space.

* * * * *